US012259301B2

(12) United States Patent
Kneller et al.

(10) Patent No.: US 12,259,301 B2
(45) Date of Patent: Mar. 25, 2025

(54) SYSTEM AND METHOD FOR DYNAMIC SIGNAL PROCESSING FOR VACUUM DECAY LEAK DETECTION

(71) Applicant: Packaging Technologies & Inspection, LLC, Hawthorne, NY (US)

(72) Inventors: Mikhail Kneller, Bronx, NY (US); Guerney Hunt, Yonkers, NY (US)

(73) Assignee: Packaging Technologies & Inspection, LLC, Hawthorne, NY (US)

( * ) Notice: Subject to any disclaimer, the term of this patent is extended or adjusted under 35 U.S.C. 154(b) by 739 days.

(21) Appl. No.: 17/218,404

(22) Filed: Mar. 31, 2021

(65) Prior Publication Data

US 2022/0316978 A1 Oct. 6, 2022

(51) Int. Cl.
*G01M 3/32* (2006.01)

(52) U.S. Cl.
CPC .................................. *G01M 3/329* (2013.01)

(58) Field of Classification Search
None
See application file for complete search history.

(56) References Cited

U.S. PATENT DOCUMENTS 4,715,214 A 12/1987 Tveter et al.
4,771,630 A * 9/1988 Croce .................. G01M 3/363 73/49.3
4,947,352 A 8/1990 Jenkins
5,231,868 A * 8/1993 Dick .................. G01M 3/3236 73/49.3
5,847,264 A 12/1998 Martin et al.
6,668,619 B2 12/2003 Yang et al.
8,544,315 B2 10/2013 Guazzo et al.
2002/0157455 A1* 10/2002 Sagi .................... G01M 3/3281 73/40
2003/0190237 A1* 10/2003 Berger .................. F04B 49/225 417/297

(Continued)

FOREIGN PATENT DOCUMENTS

DE 102011014908 A1 11/2011
WO WO-2020032978 A1 * 2/2020 .......... G01M 3/3209

OTHER PUBLICATIONS

Admin AfterAcademy "What is Burst time, Arrival time, Exit time, Response time, Waiting time, Turnaround time, and Throughput?" Nov. 3, 2019 downloaded from What is Burst time, Arrival time, Exit time, Response time, Waiting time, Turnaround time, and Throughput? (afteracademy.com) (Year: 2019).*

(Continued)

*Primary Examiner* — Michael J Dalbo
*Assistant Examiner* — Denise R Karavias
(74) *Attorney, Agent, or Firm* — Benesch Friedlander Coplan & Aronoff LLP

(57) ABSTRACT

A leak detection apparatus includes a test chamber and a vacuum source connected to the test chamber via a pneumatic line. A first pressure transducer is in communication with the test chamber. A controller is configured to collect and analyze data generated by the first pressure transducer at a predetermined frequency throughout an entire test cycle. The controller is also configured to convert specified collected data to logarithmic scale to accumulate a first set of data and apply a linear regression to the first set of data and determine regression parameters.

22 Claims, 4 Drawing Sheets

(56) References Cited

U.S. PATENT DOCUMENTS

| | | | | |
|---|---|---|---|---|
| 2005/0247110 | A1 | 11/2005 | Sagi et al. | |
| 2010/0198635 | A1* | 8/2010 | Pirtle | G06Q 10/04<br>705/7.41 |
| 2013/0186183 | A1* | 7/2013 | Dobler | G01M 3/26<br>73/49.3 |
| 2016/0245434 | A1 | 8/2016 | Seeley | |
| 2019/0292901 | A1* | 9/2019 | Islam | E21B 49/008 |
| 2019/0339157 | A1* | 11/2019 | Stauffer | G01M 3/02 |
| 2020/0049585 | A1* | 2/2020 | Mordaunt | G01M 3/2815 |

OTHER PUBLICATIONS

USALAB Blog "How to Minimize Errors in Measurement" Sep. 11, 2019 downloaded from https://www.usalab.com/blog/how-to-minimize-errors-in-measurement/ (Year: 2019).*

Sonderegger et al., "Very fast-opening UHV gate valve" Journal of Vacuum Science & Technology A Vo. 31 Issue 6, Aug. 5, 2013, https://doi.org/10.1116/1.4813836 (Year: 2013).*

International Search Report and Written Opinion issued in PCT/US2021/054344, mailing date Feb. 23, 2022.

* cited by examiner

SYSTEM AND METHOD FOR DYNAMIC SIGNAL PROCESSING FOR VACUUM DECAY LEAK DETECTION

FIELD

The present disclosure relates to systems and methods for leak detection.

BACKGROUND

Package leak testing often uses a vacuum decay test method in which vacuum is drawn on a package in a test chamber. The vacuum level in the test chamber is measured to determine the presence or absence of a leak in the package. For example, a pressure increase at a specified point in time that exceeds a predetermined pass/fail limit established using negative controls indicates a leak. Accurate measurements and data interpretations are important to achieve accurate test results. However, it is challenging to improve the signal to noise ratio of the pressure measurements.

SUMMARY

In a given example, a leak detection apparatus includes a test chamber and a vacuum source connected to the test chamber via a pneumatic line. The leak detection apparatus includes a first pressure transducer in communication with test chamber. The leak detection apparatus also includes a controller. The controller is configured to collect and analyze data generated by the first pressure transducer at a predetermined frequency throughout an entire test cycle. The controller is also configured to convert specified collected data to logarithmic scale to accumulate a first set of data and apply a linear regression to the first set of data and determine regression parameters.

The controller may be configured to perform a vacuum decay leak test using a leak detection system including a sensor. The controller includes a data acquisition module configured to collect data generated by the sensor. The controller includes a statistical signal processing module configured to convert specified collected data to logarithmic scale to accumulate a first set of data and determine linear regression parameters of the data based on the first set of data, A method of performing a vacuum decay leak test using a leak detection system including a pressure transducer. The method includes starting the vacuum decay leak test and setting a predetermined evacuation period and a predetermined steady state period. The method includes collecting data from the pressure transducer at a predetermined frequency throughout an entire test cycle. The method also includes performing statistical signal processing on the collected data and dynamically updating test conditions.

DETAILED DESCRIPTION

Figure 1:
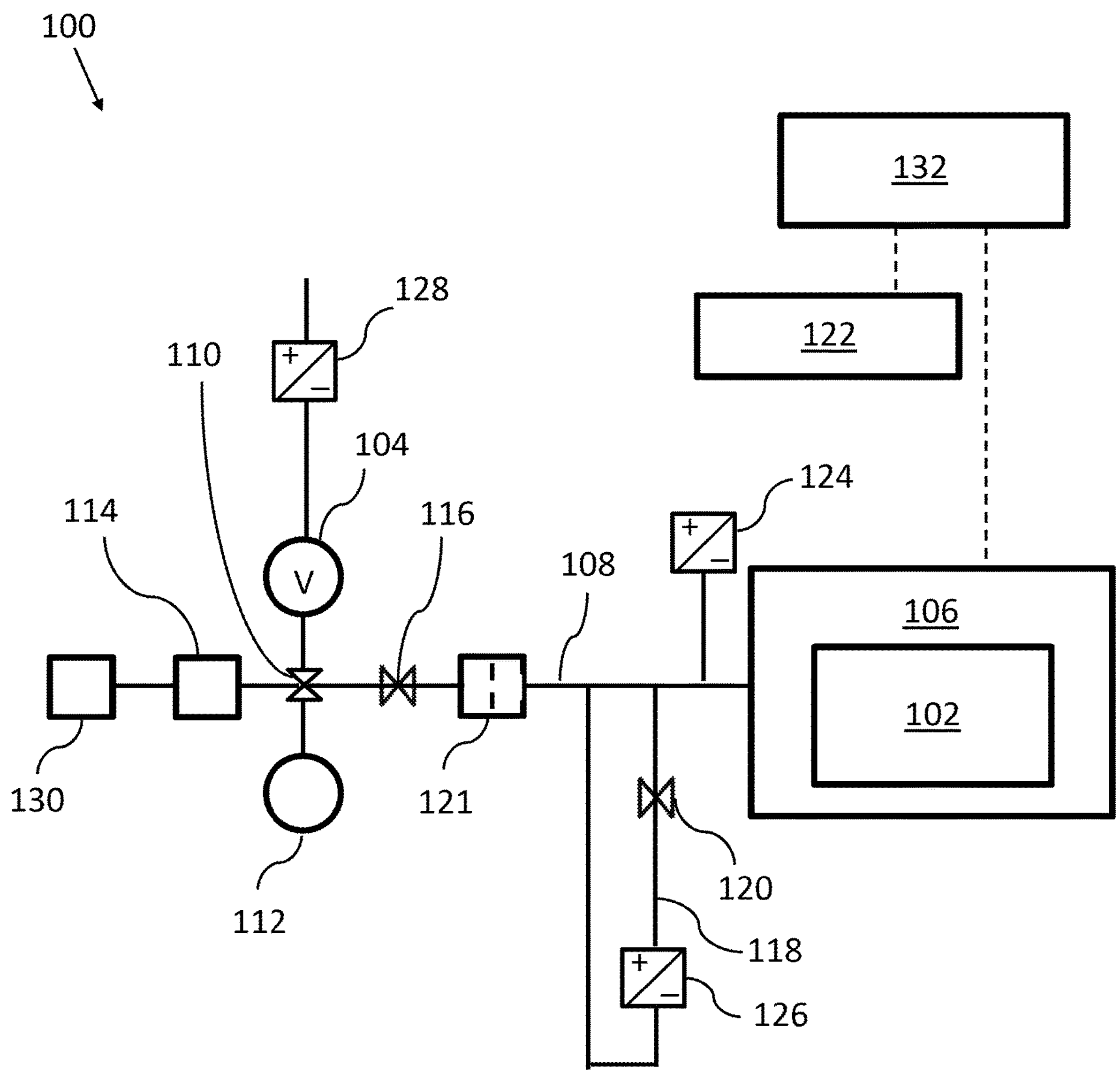
FIG. 1 shows a diagram of an exemplary vacuum decay leak detection system.

The apparatus shown schematically in the drawings has components that are examples of the elements recited in the system claims, and can be operated in steps that are examples of the elements recited in the method claims. Functionally equivalent components and steps within the scope of the disclosure, in addition to those described herein, will be apparent to those skilled in the art from the following descriptions. Such modifications and variations are intended to fall within the scope of the claims.

The present disclosure is directed to systems and methods for testing a package or container such as, for example, a non-porous vial, ampoule, injection cartridge, ophthalmic product package, syringe, pouch, blister package other package containing medicinal and/or chemical products. More particularly, the present disclosure is directed to systems and methods for vacuum or pressure decay leak test and is intended to reduce test cycle time and improve signal to noise ratio and decision confidence level. The entire leak test cycle includes both an evacuation period and a steady state period. During both the evacuation and steady state periods, system variables are continuously monitored to observe the dynamic changes occurring in the test chamber. The monitored dynamic variables, including at least pressure of the test chamber, are measured as rapidly and accurately as possible and recorded along with time when each measurement is performed. Other dynamically changing variables are including but not limited to temperature of the gas, concentration of different components in the gas mix, humidity, volume of the test chamber, etc. may also be monitored. During both the evacuation and steady state periods, the leak detection test system described herein is configured to perform the calculations to assess the degree to which the experimental data conforms to one or several expected, suitable analytical functions. The expected function for either the evacuation or steady state period corresponds to the corresponding pressure curve observed during testing of a negative control sample. The analytical function includes at least a static equation parameter and a dynamic equation parameter. The leak detection system is also capable of storing the measured parameters and identifying a specific set of stored parameters as a calibrated vacuum decay leak detection response curve (e.g., pressure profile as a function of time). At least one known non-leaking sample (e.g., negative control sample) is used to collect the calibration curve, however, the calibration curve may also be obtained from a statistical computation across many calibration tests of negative samples. For example, a single calibration test on a negative control sample or a set of calibration tests on one or multiple negative control samples may be performed to generate the calibration curve. Estimates of statistical variance or statistical standard deviation of each measurements and/or estimates of statistical variance of each equation parameters with respect to the analytical function are recorded and may be used for dynamic determination of the operation and/or results of the leak detection test. Additionally, standard deviation and average values for the parameters of a set of calibration values may be used for determining the results of the leak detection test.

Once the calibrated response curve (from both the evacuation period and the steady state period) and associated parameters are established, unknown sample tests are performed with identical calculations. Deviations of the new measurements from the calibrated response curves may be evaluated based on the standard deviation of calibrated statistical residuals or based on standard deviation of parameter values for a set of calibration readings. Statistical hypotheses are used to determine whether to abort or continue the leak detection test. For example, based on the statistical hypotheses if the deviation between the measurements and the corresponding calibrated response curve is greater than a predetermined value, the test system may determine to abort the test and reject the sample. Statistical hypotheses may also be used to dynamically determine and update the test conditions.

Once the leak detection test is completed, parameters of the measured response curve are calculated and compared to that of the calibrated response curve (from both the evacuation period and the steady state period). The differences are evaluated based on the standard deviations of the calibrated parameters to determine a pass/fail status of the test sample. Significant differences between static equation parameters may be used to screen for non-standard test conditions. The presence of non-standard test conditions may affect the decision confidence and may be used as a warning of an increased probability of false negative or false positive results.

The systems and methods for vacuum or pressure decay leak test disclosed herein are capable of characterizing the curve of pressure over time and interpreting pressure measurements on the logarithmic domain, which allows for accurate processing of dynamic pressure changes (as opposed to a measured pressure at a point in time). The systems and methods disclosed herein use mathematical model(s) derived from the relationship between the ideal gas law and mass flow from a venting chamber, to analyze the dynamic pressure behavior. Equations, similar to those derived in compressible flow texts (e.g., isothermal and adiabatic gas expansion) are used to develop an expected function for a pressure over time model. The systems and methods disclosed herein rapidly measure pressure during the decay, or pressurization of the test chamber, and map the behavior to the expected model.

Because the ideal gas law defines pressure proportional to volume, temperature, and amount of substance (mass), all variables are therefore log-normally, not normally, distributed. The systems and methods disclosed herein therefore use lognormal domain variables for performing analysis. This allows for a true normal distribution analysis on linear regression of the test data. The systems and methods disclosed herein provide a new model, oriented around the dynamic behavior of the pressure decay curve, and are capable of achieving increased statistical accuracy in differentiation of the test results.

FIG. 1 shows an example test system (e.g., a vacuum decay leak detection system) 100 configured to inspect a package or container 102. In the illustrated example, the package 102 is a non-porous container such as, for example, a chemical and/or medicinal containing vial, pouch, blister pack, ampoule, syringe, injection cartridge or ophthalmic package. The test system 100 includes a vacuum supply or source 104 and a test chamber 106 connected by a pneumatic line 108. A selector valve 110 is placed in communication with the pneumatic line 108 between the vacuum supply 104 and the chamber valve 116. A compressed air supply 112 (e.g., clean and dry compressed air) for venting and an ambient air exhaust 114 are in communication with the pneumatic line 108 at the selector valve 110. A chamber valve 116 is placed in communication with the pneumatic line 108 between the selector valve 110 and the test chamber 106. The selector valve 110 is configured to change the source being supplied to the pneumatic line 108 connected to the chamber valve 116. For example, the selector valve 110 may be used to selectively supply vacuum (from the vacuum supply 104), compressed air (from the compressed air supply 112), or ambient air (from the ambient air 114) to the pneumatic line 108 to the chamber valve 116. In the embodiment that the compressed air supply 112 is omitted, the ambient air 114 is used for venting.

A bypass or bypass pneumatic line 118 is in communication with the pneumatic line 108 by way of a bypass valve 120 is placed in communication with the bypass 118. A precision restriction orifice 121 is placed in communication with the pneumatic line 108 between the chamber valve 116 and the test chamber 106 or between the chamber valve 116 and the bypass pneumatic line 118. The precision restriction orifice 121 is configured to make the flow properties more consistent, which may increase accuracy or the ability for the test system to correspond more strongly to the results of another similarly constructed test system.

The test system 100 includes sensors 122, which include a first pressure transducer 124, a differential pressure transducer 126, a second pressure transducer 128, and weather sensor(s) 130. The first pressure transducer 124 is configured to measure a pressure corresponding to the pressure inside the test chamber 106. For example, the first pressure transducer 124 may be an absolute pressure transducer or a gauge pressure transducer. The first pressure transducer 124 is placed in communication with the test chamber 106. The first pressure transducer 124 may be in communication with the pneumatic line 108 between the chamber valve 116 and the test chamber 106. Alternatively, the first pressure transducer 124 may be directly connected to the test chamber 106 instead of connecting to the test chamber 106 through the pneumatic line 108. The differential pressure transducer 126 is placed in communication with the bypass 118 with the bypass valve 120 in between the chamber valve 116 and the differential pressure transducer 126. The weather sensor(s) 130 is placed in communication with the ambient air exhaust 114 to measure the pressure, temperature, humidity, and/or compositions of the gas at the ambient air exhaust 114. The weather sensor(s) 130 may include a pressure sensor (e.g., barometric pressure sensor), a temperature sensor, a humidity sensor, a gas sensor (e.g., water vapor sensor, oxygen sensor, carbon dioxide sensor, helium or other traceable gas analyzer), a mass flow meter, or a combination thereof.

The incorporation of the sensors 122 in the test system 100 includes elements that are essential to leak detection, such as the first pressure transducer 124, and may include other elements that increase the accuracy, repeatability, and/or reproducibility of the test results. As one example, the differential pressure transducer 126 is capable of focusing to 10 to 100 times smaller pressure span and thereby increases the resolution of the measurements. This effectively reduces electromagnetic interference noise and digitizing errors.

As another example, if the vacuum supply is not steady, which could happen when several non-synchronized elements of the test system compete for the same vacuum source or compress air, it may be challenging to get good repeatability on consecutive leak test results. Incorporation of the second pressure transducer 128 allows direct measurements of the pressure at the vacuum supply 104. This information is valuable to improve the repeatability of the test results. For example, the second pressure transducer 128 may be an absolute pressure transducer or a gauge pressure transducer.

As another example, leak tests performed at different ambient environments may affect the reproducibility of the test results. The incorporation of the weather sensor(s) 130 provides access to direct measurements of the pressure, temperature, humidity, etc. at the ambient air exhaust 114. This information is valuable to improve the reproducibility of the test results.

The test system 100 includes a controller or control system 132 configured to operate and coordinate the operation of the test system 100. The controller 132 may be a computer or may include any suitable processer(s), microprocessor(s), transceiver(s), memory, a timer, analog-to-digital convertor(s) (ADC), programmable logic controller(s) (PLC), human machine interface(s) (HMI), etc. to enable its functions. The controller 132 may include any suitable user interface and/or display to allow output of the test results and allow a user to program or control the operation of the test system 100. The controller 132 may perform leak tests following pre-programmed procedures and/or may perform dynamic analyses to update the test procedures in-situ. In particular, the controller 132 includes special modules to perform dynamic signal processing and updating the operation of the test system 100.

In an alternative embodiment, one or more components of the test system 100 may be omitted. For example, the precision restriction orifice 121 may be omitted. For example, the test system 100 may omit the bypass 118, the bypass valve 120, the differential pressure transducer 126, and the second pressure transducer 128. In this case, the test system 100 may perform a leak test under a basic mode based on pressure signals from the first pressure transducer 124.

For example, the test system 100 may omit the second pressure transducer 128. In this case, the test system 100 may perform a leak test under a dual-sensor mode based on pressure signals from the first pressure transducer 124 and the differential pressure transducer 126.

For example, the test system 100 may omit the bypass 118, the bypass valve 120, and the differential pressure transducer 126, and the test system 100 may perform a leak test under a repeatability-improved mode based on pressure signals from the first pressure transducer 124 and the second pressure transducer 128. In one embodiment, the test system 100 may omit the bypass 118, the bypass valve 120, and the differential pressure transducer 126, and the test system 100 may perform a leak test under a reproducibility-improved mode based on pressure signals from the first pressure transducer 124 and the second pressure transducer 128 and based on signals from the weather sensor(s) 130 (e.g., signals corresponding to the pressure, temperature, humidity, and/or compositions of the gas at the ambient air exhaust 114). In one embodiment, the test system 100 may perform a leak test under a combination of two or more of the above mentioned test modes (e.g., the basic mode, the dual-sensor mode, the repeatability-improved mode, the reproducibility-improved mode).

Figure 2:
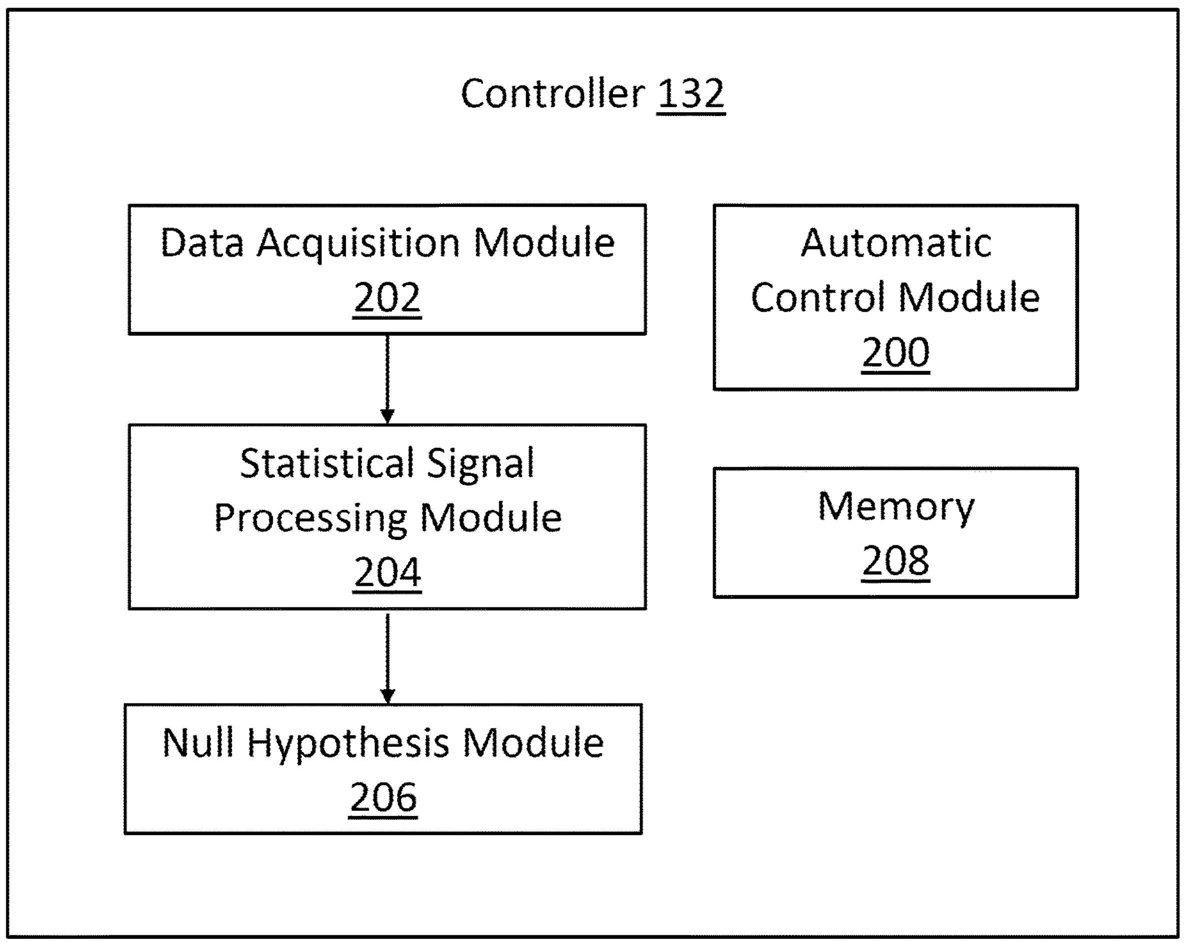
FIG. 2 shows a diagram of an exemplary controller of the vacuum decay leak detection of FIG. 1.

FIG. 2 shows an exemplary controller 132 configured to perform dynamic signal processing for a vacuum decay leak detection test. In the illustrated embodiment, the controller 132 includes an automatic control module 200, a data acquisition module 202, a statistical signal processing module 204, a statistical hypotheses evaluation module or null hypothesis module 206, and a memory 208. The automatic control module 200 is capable of transmitting signals to control operations of the various components of the test system 100.

The data acquisition module 202 is capable of receiving data or signals from sensors 122. Specifically, the data acquisition module 202 collects data during the entire test cycle (e.g., both the evacuation period and the steady state period) as opposed to collecting data only at certain moments (e.g., at the start of a test cycle, at the end of a test cycle, at venting, etc.). For example, the data acquisition module 202 collects entire signals from the first pressure transducer 124, the differential pressure transducer 126, or both, over the entire test cycle including the evacuation period and the steady state period. The first pressure transducer 124 and the differential pressure transducer 126 are designed to sample data at certain frequency. All data sampled at the designed frequency throughout the entire test cycle including the evacuation period and the steady state period are collected by the data acquisition module 202. The collected signals are communicated to the statistical signal processing module 204, and the processed signals are communicated to the null hypothesis module 206, which determines whether to continue or abort a test, a test result (e.g., pass/fail, confidence level, etc.), and/or a suitable test condition (e.g., basic mode, dual-sensor mode, repeatability-improved mode, reproducibility-improved mode, adjusted test conditions, or a combination thereof). Preferably, each of the response time of the valves (the selector valve 110, the chamber valve 116, and the bypass valve 120), the response time of the transducers (e.g., the first pressure transducer 124, the differential pressure transducer 126, and the second pressure transducer 128), and the response time of the data acquisition sampling is at least two orders of magnitude faster than the evacuation time.

The controller 132 is capable of performing dynamic signal processing and dynamically updating the operations of the test system 100. In a typical vacuum decay leak detection test, the pressure exhibits exponential changes indicating the flow of gas while the oscillations in the pressure readings are noises. These noises are attributed by variables irrelevant to the leak detection test and may lower the accuracy of the test results. The statistical processing module 204 uses statistical techniques to filter noises from the pressure readings proportional to the flow of gas. Taking the advantages that the pressure readings may be approximated following a power law or equation or an exponential model or equation, taking natural logarithm of the power equation or an exponential equation that approximates the pressure readings allows differentiations of the noises, the semi-static variables, and the variables that cause proportional dynamic pressure changes. The statistical processing module 204 may also map the dynamic variables to more than one expected pressure curve. In such cases, the natural logarithm for the curve of any given the model must result in a system that is normally distributed.

In particular, the pressure readings are expected to follow known step response functions which can be approximated as an exponential function or other similar functions. Equation (1) shows an exponential function:

$$P(t)=Ae^{tb}\xi \qquad \text{Equation (1)}$$

where p(t) is pressure as a function of time, A is a coefficient reflecting semi-static variables, b is a coefficient reflecting variables causing proportional dynamic pressure changes, and $\xi$ is noise.

Natural logarithm of Equation (1) gives Equation (2):

$$\ln(P(t))=\ln(A)+bt+\ln(\xi) \qquad \text{Equation (2)}$$

Substituting $y=\ln(P)$, $\alpha=\ln(A)$, $x=t$, $\beta=b$, and $\varepsilon=\ln(\xi)$ gives Equation (3):

$$y=\alpha+\beta x+\varepsilon_i \qquad \text{Equation (3)}$$

Equation (3) is therefore a normal distributed regression of the pressure readings. Parameter $\alpha$ is related to A, and is associated with static or quasi-static components, for example, the start pressure conditions at the vacuum supply 104 and the barometric pressure in the vented chamber (e.g., compressed air supply 112). Parameter β is, equivalent to b, and is associated with components affecting the dynamic behavior of the system, for example, the air volume in the test chamber 106 and orifices (e.g., leaks) in the package 102. Parameter $\varepsilon_i$ is the noise or error term. A single parameter, or a mathematical combination of parameters may be used for leak test cycle evaluation.

As another example, the step response function may be approximated by a power function. Equation (4) shows the power function.

$$P(t)=At^{b}\xi \quad \text{Equation (4)}$$

If n data pairs, $\{(x_i, y_i=1, \ldots, n)\}$ are generated during the leak test cycle, the underlying relationship between $y_i$, and $x_i$ including the noise or error $\varepsilon_i$ term can be estimated using a linear regression model. The goal is to find parameters $a_1$ and $b_1$ which are the values α and β of equation 3 that provide the best fit for all data points, $\{(x_i, y_i), i=1, \ldots, n)\}$. The solutions for the intersect, slope, standard deviation of the intersect, standard deviation of the slope, and standard deviation of residuals are listed in Equations (5)-(9), respectively.

$$a=(\Sigma y-b\Sigma x)/n \quad \text{Equation (5)}$$

$$b=(n\Sigma xy-\Sigma x\Sigma y)/(n\Sigma x^2-(\Sigma x)^2) \quad \text{Equation (6)}$$

$$S_a=S_b\sqrt{\Sigma x^2/n} \quad \text{Equation (7)}$$

$$S_b=S_e\sqrt{n/(n\Sigma x^2-(\Sigma x)^2} \quad \text{Equation (8)}$$

$$S_e=\sqrt{(n\Sigma y^2-(\Sigma y)^2-b^2(n\Sigma x^2-(\Sigma x)^2))/n(n-2)} \quad \text{Equation (9)}$$

wherein a is the intersect, b is the slope, $S_a$ is the standard deviation of intersect, $S_b$ is the standard deviation of slope, and $S_e$ is the standard deviation of residuals. The controller 132 is configured to determine calibrated regression parameters, $a_0$ and $b_0$ based on a known negative control sample (e.g., a known package that contains no leak). The controller 132 may operate the test system 100 to run a calibration test on reference samples (e.g., a negative control sample and/or a positive control sample, e.g., a known package that contains a leak) and use the collected control data to determine the calibrated regression parameters, $a_0$ and $b_0$, based on Equations (1)-(6). for the calibrated regression parameters, $a_0$ and $b_0$ may be determined by a single test or by averaged values from a set of calibration tests. In the case that $a_0$ and $b_0$ are determined from a set of tests, the standard deviation of the best fit $a_0$ and $b_0$ values for each test may be computed and used for later score analysis (e.g., t-value or t-score analysis). Since the test includes the evacuation period and the steady state period, there are at least two sets of calibration parameters, $a_0$ and $b_0$, corresponding to each test period. The calibrated regression parameters, $a_0$ and $b_0$, for the evacuation period are different from $a_0$ and $b_0$ for the steady state period.

The data, the calibrated regression parameters, $a_0$ and $b_0$, and the calibrated response function or curve ($y_0=a_0+b_0x$) from the negative control sample are stored in the memory 208. In some embodiments, the calibration data (from the negative control sample) may exclude pressure data during the initial stage of evacuation. In one example, the modeling or calculation of the calibrated response curves only occurs after the pressure reaches a predetermined vacuum threshold, e.g., about 800 millibar, and the pressure data before this point is ignored. Once the calibration data (e.g., the calibrated regression parameters, $a_0$ and $b_0$, and other significant statistical values such as $S_a$, $S_b$, etc.) are established, the controller 132 uses statistical methods to determine whether to continue or abort the test, to determine test period results, and/or to determine suitable test conditions.

Figure 3:
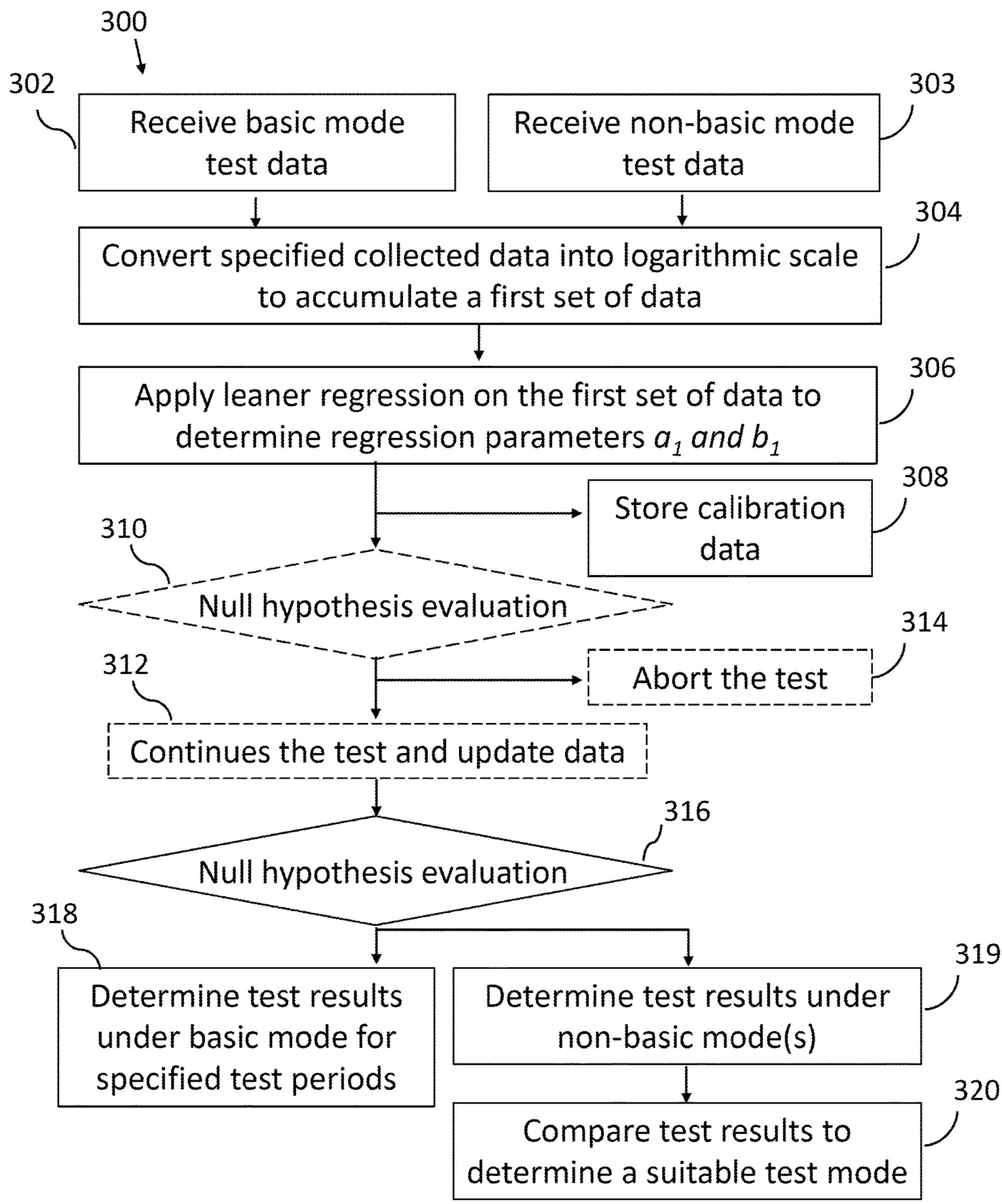
FIG. 3 shows exemplary statistical analyses performed by the vacuum decay leak detection system of FIG. 1.

FIG. 3 shows an exemplary statistical analyses 300 performed by the statistical signal processing module 204 and the null hypothesis module 206. The data discussed herein may be any data from the sensors 122. For the purpose of discussion, pressure data collected over time (e.g., pressure data as a function of time) are used to illustrate the statistical analyses 300. The statistical analyses 300 enable the determination of test results (e.g., pass/fail) under the basic mode and also the selection of a suitable test mode (e.g., basic mode, dual-sensor mode, repeatability-improved mode, adjusted test conditions, and reproducibility-improved mode) based on null hypothesis evaluation. The statistical analyses 300 may be performed on the evacuation period and the steady state period of the test cycle.

In the case that the statistical analyses 300 are performed to determine the test results (e.g., pass/fail) under the basic mode, the statistical analyses 300 include receiving the basic-mode test data (step 302) and converting specified collected data into logarithmic scale to accumulate a first set of data (step 304). The specified collected data may include all or a portion of the collected data. For example, if the response curve (pressure readings as a function of time) is to be approximated by an exponential function (e.g., Equation (1)), only the pressure values are converted into a logarithmic scale, while the time values remain in normal scale in step 304. Alternately, if the response curve is to be approximated by a power function (e.g., Equation (4)), both the pressure and time values are converted into logarithmic scale in step 304.

The statistical analyses 300 include applying linear regression on the first set of data to determine regression parameters $a_1$ and $b_1$ (step 306). The first set of data are expected to generally follow the linear relationship of Equation (3). In the event that a different step response function is used, the data will be expected to follow the appropriate relationship associated with the logarithmic domain analysis of this alternate step function.

The statistical analyses 300 include storing calibration data (step 308). If the sample being tested is a negative control sample, data including the response curve, the first set of data accumulated in step 304, and/or the regression parameters $a_1$ and $b_1$ are stored as calibration data (for at least one of the evacuation period and the stead state period). For example, the regression parameters $a_1$ and $b_1$ from a negative control sample's evacuation curve response are stored in the memory 208 as the calibrated regression parameters or baseline parameters, $a_0$ and $b_0$ for the evacuation period. The evacuation response curve of a negative control sample is also stored as calibration data for determining a suitable evacuation time or evacuation time cutoff for the test sample. The steady state response curve of a negative control sample may also be stored as calibration data for determining a suitable steady state period for the test sample. The calibration data may include data from a single test run, e.g., standard deviation of the residuals is used, or may include a set of data, e.g., a set of calibration tests are performed and the standard deviation and averaged $a_0$ and $b_0$ are determined.

The statistical analyses 300 include performing null hypothesis evaluation (step 310). The null hypothesis evaluation is setup up or configured to determine if there is a significant statistical difference between the leak test conducted on the test sample and the leak test performed on a reference sample, such as a negative control sample or a known sample, e.g., a sample tested under a basic mode. The null hypothesis evaluation is performed by the null hypothesis module 206 of the controller 132. The null hypothesis module 206 may use a two sample t-test to test whether the means of the testing data of the reference and test samples are equal. The null hypothesis evaluation may be based on comparisons of individual measurements, static parameters, or dynamic responses of the test and reference samples, or any appropriate combination or transformation of these parameters.

In step 310, the null hypothesis evaluation may be set up to determine to continue or abort the test based on the comparison between the analyzed test data (data obtained at the end of step 306) and the calibration data (stored in step 308 during a calibration test). If there is no significant difference between measurements of the test sample, $y_1(x)$, and measurements of the calibrated response function, $y_0=a_0+b_0x$, the hypothesis is accepted. The null hypothesis module 206 may calculate a t-value, $T_e$, based on Equation (10) and compare $T_e$ to T-statistic values for a given number of measurements on the response curve n and degree of freedom, n−2.

$$T_e=(y_1(x)-a_0-b_0x)/S_e \quad \text{Equation (10)}$$

If the null hypothesis is accepted based on Equation (10), the leak test continues and updates data in step 312. As the leak test continues, the test data is received and processed in the same manner as discussed in steps 302 through 310, such that the data updated in step 312 include data from the entire test cycle.

If the null hypothesis is rejected, the test is aborted in step 314, which also indicates that the test sample fails (e.g., leak is present in the sample).

The null hypothesis in step 310 may be performed at any time during the test cycle before the completion of the test cycle. For example, the null hypothesis in step 310 to determine whether to continue or abort the test may be performed when the evacuation period expires. In other examples, the null hypothesis in step 310 may be performed at the early stage (e.g., first ⅓) of the evacuation period, at the middle stage (e.g., the middle ⅓) of the evacuation period, at the later stage (e.g., the later ⅓) of the evacuation period, at the beginning stage (e.g., first ⅓) of the steady state period, at the middle stage (e.g., the middle ⅓) of the steady state period, or at the later stage (e.g., the later ⅓) of the steady state period and before the end of the test cycle. The capability of early determination to abort the leak test when the sample response deviates significantly from that of the negative control sample allows time saving and reduces the possibility of chamber contamination from the leak.

The statistical analyses 300 include performing null hypothesis evaluation (step 316) and determining test results under the basic mode for specified test periods (step 318). The specified test periods may include the evacuation period, the steady state period, or both. In steps 316 and 318, the null hypothesis module 206 may determine pass or fail of a test sample based on null hypothesis evaluations of the comparison between the data collected and analyzed at the end of the test cycle and the calibration data from a negative control sample. If there is a significant statistical difference between the dynamic responses of the test sample and the negative control sample, the null hypothesis module 206 may determine a fail status of the test sample; otherwise, the test sample passes.

In the embodiment that the response curve is approximated by an exponential function (e.g., Equation (1)), the null hypothesis module 206 may calculate a t-value, $T_b$, based on Equation (11) and compare $T_b$ to T-statistic values for a given number of measurements on the response curve n and degree of freedom, n−2.

$$T_b=(b_1-b_0)/S_b \quad \text{Equation (11)}$$

In the embodiment that the response curve is approximated by a power law function (e.g., Equation (4)), the null hypothesis module 206 may calculate a t-value, T, based on Equation (12) and compare T to T-statistic values for a given number of measurements on the response curve n and degree of freedom, n−2.

$$T=[(a_1-a_0)+(b_1-b_0)\ln(t)]/S_b \quad \text{Equation (12)}$$

If the hypothesis is rejected, the test sample fails (e.g., presence of a leak). If the null hypothesis is accepted, the test sample passes (e.g., absence of a leak).

The test results from step 318 and statistical values or parameters determined through the statistical analyses 300 (e.g., $a_0$ and $b_0$, $a_1$ and $b_1$, t-values, and other significant statistical values such as $S_a$, $S_b$, etc.) may be stored as calibration data (e.g., calibration data of the test performed under the basic mode) in the memory 208.

Alternatively, steps 310, 312, and 314 may be omitted. In this case, the statistical analyses 300 include performing leak test under the basic mode and receiving test data when the test cycle is completed in step 302. The specified collected data is processed/analyzed following steps 304 and 306. Statistical comparison between $a_1$ and $a_0$ and $b_1$ and $b_0$ for both the steady state period and the evacuation period is performed to assess whether there is a significant statistical difference to determine test results (e.g., pass/fail) of the sample tested under the basic mode (e.g., steps 316 and 318).

In the embodiment that the statistical analyses 300 are performed to determine a suitable test mode, the statistical analyses 300 include receiving non-basic mode test data (e.g., adjusted test conditions, dual-sensor mode, repeatability-improved mode, and reproducibility-improved mode) in step 303. The analyses then proceed in the same manner as discussed in steps 304 through 316.

In step 319, the null hypothesis module 206 determines pass or fail of a test sample tested under a non-basic mode based on null hypothesis evaluations of the comparison between the data collected and analyzed at the end of the test cycle and the calibration data from a negative control sample. This evaluation may be done in the same manner as that discussed in steps 316 and 318. If there is a significant statistical difference between the dynamic responses of the test sample and the negative control sample, the null hypothesis module 206 determines a fail status of the test sample; otherwise, the test sample passes.

Steps 303, 304-316, and 319 may be repeated for tests performed under each mode (e.g., adjusted test conditions, dual-sensor mode, repeatability-improved mode, reproducibility-improved mode). Results from each test mode or condition may be stored as calibration data in the memory 208.

In step 320, the null hypothesis module 206 compares test results of different modes (e.g., basic mode, adjusted test conditions, dual-sensor mode, repeatability-improved mode, and reproducibility-improved mode) to determines a suitable test mode for the test sample based on null hypothesis evaluation. The null hypothesis module 206 may calculate and compare t-values to determine a more suitable test mode.

For example, the null hypothesis module 206 may calculate a t-value, $T_a$, for test performed under adjusted test conditions based on Equation (13) and compare $T_a$ to T-statistic values tested under basic mode for a given number of measurements on the response curve n and degree of freedom, n−2.

$$T_a=(a_1-a_0)/S_a \quad \text{Equation (13)}$$

If the null hypothesis is accepted based on Equation (13), the null hypothesis module 206 determines the basic mode as the suitable mode. If the null hypothesis is rejected, the null hypothesis module 206 determines it is more suitable to adjust test conditions.

For example, the null hypothesis module 206 may calculate a t-value, $T_b$, based on Equation (11) for test(s) performed under dual-sensor mode. The null hypothesis module 206 may compare $T_b$ to T-statistic values obtained under basic mode for a given number of measurements on the response curve n and degree of freedom, n−2. If the null hypothesis is accepted, the null hypothesis module 206 determines the basic mode as the suitable mode. If the null hypothesis is rejected, the null hypothesis module 206 determines the dual-sensor mode as the suitable mode.

For example, the null hypothesis module 206 may calculate $T_a$ for test(s) performed under repeatability-improved mode, and compare it to T-statistic values obtained under basic mode. If the null hypothesis is accepted, the null hypothesis module 206 determines the basic mode as the suitable mode. If the null hypothesis is rejected, the null hypothesis module 206 determines the repeatability-improved mode as the suitable mode.

For example, the null hypothesis module 206 may calculate $T_a$ for test(s) performed under reproducibility-improved mode, and compare it to T-statistic values obtained under basic mode. If the null hypothesis is accepted, the null hypothesis module 206 determines the basic mode as the suitable mode. If the null hypothesis is rejected, the null hypothesis module 206 determines the reproducibility-improved mode as the suitable mode.

For example, the null hypothesis module 206 may compare $T_a$, $T_b$, or both (obtained for the selected test mode, e.g., adjusted test conditions, dual-sensor mode, repeatability-improved mode, reproducibility-improved mode) to T-statistic values obtained from the basic mode, to determine a suitable test mode for the test sample.

Furthermore, the null hypothesis module 206 may determine to upgrade the basic mode, the dual-sensor mode, or the repeatability-improved mode, to the reproducibility-improved mode with data from the weather sensor(s) 130. Based on null hypothesis evaluation, the null hypothesis module 206 may determine to upgrade any of the basic mode, the dual-sensor mode, the repeatability-improved mode, the reproducibility-improved mode, or a combination thereof, with data from the sensors 122 including a mass flow sensor, a displacement sensor, a deformation or volumetric change sensor (e.g., using laser triangulation, machine vision, etc.), a stress sensor, or a combination thereof.

Figure 4:
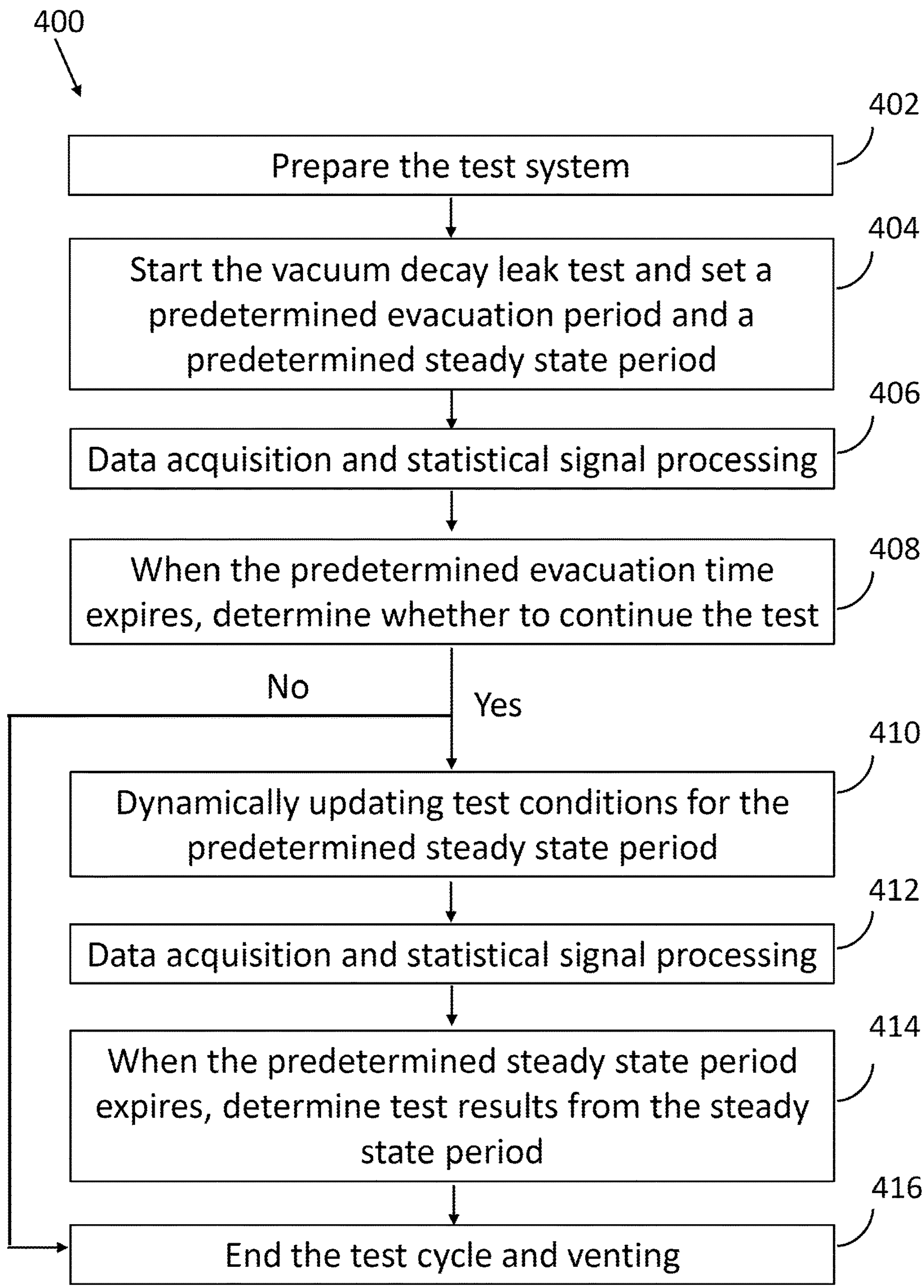
FIG. 4 shows an exemplary method for vacuum decay leak detection using the vacuum decay leak detection system of FIG. 1.

FIG. 4 shows a method 400 for vacuum decay leak detection using the test system 100. The steps discussed herein is controlled and executed by the controller 132. The method 400 includes preparing the test system (step 402). At step 402, the test chamber 106 is vented through the ambient air exhaust 114, the test sample (e.g., the package 102) is placed inside the test chamber 106, and the test chamber 106 is closed.

The method 400 includes starting the vacuum decay leak test and setting a predetermined evacuation period and a predetermined steady state period (step 404). This predetermined time may have been set by an automatic process conducted in statistical evaluation calibration and stored as calibration data (step 308 in FIG. 3). At step 404, the automatic control module 200 sends control signals to connect the selector valve 110 to the vacuum supply 104 and open the chamber valve 116 such that the vacuum supply 104 is in communication with the test chamber 106 and begins to pull vacuum on the test chamber 106. As soon as the vacuum is being pulled on the test chamber 106, a timer of the test system 100 is triggered. This is the beginning of the evacuation period.

The method 400 includes performing data acquisition and statistical signal processing (step 406). At step 406, the data acquisition module 202 receives readings or data from the sensors 122. For example, the data acquisition module 202 receives readings from the first pressure transducer 124 and/or the second pressure transducer 128 along with time measurements. The statistical signal processing module 204 then converts some or all of this data into logarithmic scale and accumulates these data for regression calculations as afore discussed in step 304 of FIG. 3.

The method 400 includes when the predetermined evacuation period expires, determining whether to continue the test (step 408). At step 408, the automatic control module 200 sends control signals to close the chamber valve 116 and to connect the selector valve 110 to the ambient air exhaust 114. In some embodiment, the automatic control module 200 sends control signal to close the bypass valve 120 (if the test is to proceed under the dual-sensor mode). The statistical signal processing module 204 completes the statistical signal processing of data from the first pressure transducer 124 received during the evacuation period and the null hypothesis module 206 determines whether to proceed to the steady state period. As afore discussed in steps 310, 312, and 314 of FIG. 3, if the null hypothesis is rejected, the null hypothesis module 206 makes the determination that the package 102 fails the evacuation test period (e.g., large leak detected), and method 400 proceeds to step 416 to end the test. At step 416, the automatic control module 200 sends control signals to abort the leak test and start venting. If the null hypothesis is accepted, the null hypothesis module 206 determines to continue to the steady state period. Step 408 allows to shorten the test cycle and substantially reduce the change or extent of chamber contaminations from a leaking package.

Alternatively, step 408 may be performed at any time before the entire test cycle completes. For example, the determination to continue or abort the test may occur at the early stage (e.g., first ⅓) of the evacuation period, at the middle stage (e.g., the middle ⅓) of the evacuation period, at the later stage (e.g., the later ⅓) of the evacuation period, at the beginning stage (e.g., first ⅓) of the steady state period, at the middle stage (e.g., the middle ⅓) of the steady state period, or at the later stage (e.g., the later ⅓) of the steady state period and before the end of the test cycle.

The method 400 includes dynamically updating test conditions for a predetermined steady state period (step 410). As afore discussed in steps 316, 319, and 320 of FIG. 3, the null hypothesis module 206 may determine to continue the leak test under the basic mode (with the standard or adjusted conditions), the dual-sensor mode, the repeatability-improved mode, the reproducibility-improved mode, or a combination thereof. Based on the determination, the controller 132 updates the test conditions and collect data from the corresponding sensors 122. Under the basic mode operation, step 410 may be omitted since the test conditions remain the same (standard conditions), or in step 410, the test conditions are updated with no update.

The method includes performing data acquisition and statistical signal processing (step 412). At step 412, the data acquisition module 202 receives data from the sensors 122. During the entire test cycle, the data acquisition module 202 always receives data from the first pressure transducer 124 along with the time measurements. If the test continues under the dual-sensor mode, in addition to the data from the first pressure transducer 124, the data acquisition module 202 also receives data from the differential pressure transducer 126 along with the time measurements. If the test continues under the repeatability-improved mode, in addition to the data from the first pressure transducer 124, the data acquisition module 202 also receives data from the second pressure transducer 128 along with the time measurements. If the test continues under the reproducibility-improved mode, in addition to the data from the first pressure transducer 124, the data acquisition module 202 also receives data from the second pressure transducer 128 along with the time measurements and data from the weather sensor(s) 130 and/or other sensors of the sensors 122 such as a mass flow sensor, a displacement sensor, a deformation or volumetric change sensor (e.g., using laser triangulation, machine vision, etc.), a stress sensor, or a combination thereof. At step 412, the statistical signal processing module 204 converts specified data collected during the predetermined test period into logarithmic scale and accumulates these data for regression calculations as afore discussed in steps 304 and 306 of FIG. 3.

The method 400 includes when the predetermined steady state period expires, determine test results from the steady state period, e.g., pass/fail (step 414). At step 414, the null hypothesis module 206 determines a pass or fail of the test sample (e.g., the package 102) based on the regression response curve calculated from step 412 and the null hypothesis evaluation as afore discussed in steps 316 and 318 or steps 316, 319, and 320 of FIG. 3. In addition to the pass/fail status, the test results may include a confidence level associated with the pass/fail status.

Finally, the method 400 includes ending the test cycle and venting (step 416). The automatic control module 200 sends control signals to open the chamber valve 116 and to connect the selector valve 110 to the compressed air supply 112 for venting.

The method 400 may include steps 402, 404, 406, 412, 414, and 416 (steps 408 and 410 are omitted) for testing a sample under the basic mode, and the test chamber 106 is closed between steps 406 and 412 to allow for steady state testing.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The invention claimed is:

1. A leak detection apparatus, comprising:
- a test chamber;
- a vacuum source connected to the test chamber via a pneumatic line;
- at least one sensor comprising a first pressure transducer in communication with the test chamber; and
- a controller configured to:
  - start a leak test under a basic mode;
  - collect and analyze data generated by the at least one sensor at a predetermined frequency throughout an entire test cycle;
  - specify a portion of the collected data;
  - convert the specified portion of the collected data to logarithmic scale to accumulate a first set of data;
  - apply a linear regression to the first set of data and determine regression parameters;
  - determine whether to abort or continue the leak test based on the regression parameters when or before a predetermined evacuation period expires; and
  - in response to a determination to continue the leak test, select at least one of test modes based on the regression parameters to continue the leak test, wherein the test modes comprise the basic mode, a dual-sensor mode, a repeatability-improved mode, and a reproducibility-improved mode, each corresponds to a selected use of the at least one sensor to collect data.

2. The leak detection apparatus of claim 1, further comprising:
- a selector valve connected to the pneumatic line to selectively isolate the vacuum source from the test chamber;
- a chamber valve connected to the pneumatic line between the selector valve and the test chamber; and
- an ambient air exhaust connected to the pneumatic line.

3. The leak detection apparatus of claim 2, wherein the selector valve has a first response time, the chamber valve has a second response time, the first pressure transducer has a third response time, and the controller has a fourth response time of data acquisition sampling, and wherein each of the first, second, third, and fourth response times is at least two orders of magnitude faster than an evacuation time of the leak detection system.

4. The leak detection apparatus of claim 2, further comprising a precision restriction orifice connected to the pneumatic line.

5. The leak detection apparatus of claim 2, further comprising:
- a bypass pneumatic line connected to the pneumatic line between the chamber valve and the test chamber;
- a bypass valve connected to the bypass pneumatic line; and
- the at least one sensor further comprising a differential pressure transducer connected to the bypass pneumatic line with the bypass valve in between the differential pressure transducer and the test chamber.

6. The leak detection apparatus of claim 1, wherein the at least one sensor further comprises a second pressure transducer configured to measure a pressure corresponding to the vacuum source.

7. The leak detection apparatus of claim 1, wherein the determination to continue or abort the leak test is based on null hypothesis evaluations of the regression parameters, and the null hypothesis evaluations are at least based on comparisons of dynamic responses of a test sample and a reference sample.

8. The leak detection apparatus of claim 1, wherein the controller is configured to determine a pass or fail leak test result based on null hypothesis evaluations of the regression parameters, and the null hypothesis evaluations are at least based on comparisons of dynamic responses of a test sample and a reference sample.

9. The leak detection apparatus of claim 1, wherein the selection of the at least one test mode is based on null hypothesis evaluations of the regression parameters, and the null hypothesis evaluations are at least based on comparisons of dynamic responses of a test sample and a reference sample.

10. The leak detection apparatus of claim 1, wherein the collected data comprise pressure data and time data, and the controller is further configured to select only the pressure data or both the pressure data and the time data based on a selected function to form the specified portion of the collected data, wherein the specified portion of the collected data comprises only the pressure data when the selected function is an exponential function, and the specified portion of the collected data comprises both the pressure data and the time data when the selected function is a power function.

11. The leak detection apparatus of claim 1, wherein the at least one sensor further comprises a second pressure transducer, a differential pressure transducer, a pressure sensor, a temperature sensor, a humidity sensor, a gas sensor, a mass flow meter, a displacement sensor, a deformation or volumetric change sensor, a stress sensor, or a combination thereof.

12. The leak detection apparatus of claim 1, wherein the at least one sensor further comprises a differential pressure transducer, a second pressure transducer, and at least one weather sensor, and the controller is configured to collect and analyze data from the first pressure transducer under the basic mode.

13. The leak detection apparatus of claim 1, wherein the at least one sensor further comprises a differential pressure transducer, a second pressure transducer, and at least one weather sensor, and the controller is configured to collect and analyze data from the first pressure transducer and the differential pressure transducer under the dual-sensor mode.

14. The leak detection apparatus of claim 1, wherein the at least one sensor further comprises a differential pressure transducer, a second pressure transducer, and at least one weather sensor, and the controller is configured to collect and analyze data from the first pressure transducer and the second pressure transducer under the repeatability-improved mode.

15. The leak detection apparatus of claim 1, wherein the at least one sensor further comprises a differential pressure transducer, a second pressure transducer, and at least one weather sensor, and the controller is configured to collect and analyze data from the first pressure transducer, the second pressure transducer, and the at least one weather sensor under the reproducibility-improved mode.

16. A method of performing a leak test using a leak detection system including at least one sensor comprising a first pressure transducer, the method comprising:

starting the leak test under a basic mode and setting a predetermined evacuation period and a predetermined steady state period;

collecting data from the at least one sensor at a predetermined frequency throughout an entire test cycle;

specifying a portion of the collected data;

converting the specified portion of the collected data into logarithmic scale to accumulate a first set of data;

determining linear regression parameters of the first set of data;

determining whether to abort or continue the leak test based on the regression parameters when or before the predetermined evacuation period expires; and in response to a determination to continue the leak test, selecting at least one of test modes based on the regression parameters to continue the leak test, wherein the test modes comprise the basic mode, a dual-sensor mode, a repeatability-improved mode, and a reproducibility-improved mode, each corresponds to a selected use of the at least one sensor to collect data.

17. The method of claim 16, wherein the selection of the at least one test mode is based on null hypothesis evaluations of the regression parameters, and the null hypothesis evaluations are at least based on comparisons of dynamic responses of a test sample and a reference sample.

18. The method of claim 16, wherein the at least one sensor further comprises a second pressure transducer, a differential pressure transducer, a pressure sensor, a temperature sensor, a humidity sensor, a gas sensor, a mass flow meter, a displacement sensor, a deformation or volumetric change sensor, a stress sensor, or a combination thereof.

19. The method of claim 16, comprising continuing the leak test under the basic mode and collecting and analyzing data from the at least one sensor comprising the first pressure transducer.

20. The method of claim 16, comprising continuing the leak test under the dual-sensor mode and collecting and analyzing data from the at least one sensor comprising the first pressure transducer and a differential pressure transducer.

21. The method of claim 16, comprising continuing the leak test under the repeatability-improved mode and collecting and analyzing data from the at least one sensor comprising the first pressure transducer and a second pressure transducer.

22. The method of claim 16, wherein comprising continuing the leak test under the reproducibility-improved mode and collecting and analyzing data from the at least one sensor comprising the first pressure transducer, a second pressure transducer, and at least one weather sensor.

* * * * *